United States Patent [19]
Miyanoki et al.

[11] 4,146,510
[45] Mar. 27, 1979

[54] FLAKE- OR SLIVER-LIKE POROUS STRUCTURE OF POLYMERIC MATERIAL AND PROCESS OF PRODUCING SAME, AND PROCESS OF PRODUCING SHEET-LIKE STRUCTURE THEREFROM

[75] Inventors: Masahiko Miyanoki; Takeshi Uotani; Fujio Itani; Toshi Yoshihara; Masayuki Igawa; Munehiro Okumura; Syoji Imao; Yoshiaki Taniyama, all of Otake, Japan

[73] Assignee: Mitsubishi Rayon Company Limited, Tokyo, Japan

[21] Appl. No.: 609,442

[22] Filed: Sep. 2, 1975

Related U.S. Application Data

[63] Continuation of Ser. No. 303,063, Nov. 2, 1972, abandoned.

[30] Foreign Application Priority Data

Nov. 12, 1971 [JP] Japan .................................. 46-89900
Dec. 20, 1971 [JP] Japan .................................. 46-102577

[51] Int. Cl.$^2$ .............................................. B29D 27/00
[52] U.S. Cl. ..................................... 521/64; 264/45.3; 264/53; 264/DIG. 5; 264/DIG. 17; 521/80; 521/55; 521/143
[58] Field of Search ....... 264/DIG. 17, 45.3, DIG. 8, 264/DIG. 5, 53, 2.5 E

[56] References Cited

U.S. PATENT DOCUMENTS

| | | | |
|---|---|---|---|
| 2,810,646 | 10/1957 | Wooding | 264/DIG. 8 |
| 3,003,304 | 10/1961 | Rasmussen | 264/DIG. 8 |
| 3,210,239 | 10/1965 | Eberl | 264/DIG. 8 |
| 3,785,919 | 1/1974 | Hickman | 264/45.3 X |
| 3,884,030 | 5/1975 | Baxter et al. | 264/DIG. 8 |
| 3,911,070 | 10/1975 | Lundsager | 264/DIG. 17 |
| 3,912,665 | 10/1975 | Spitzer et al. | 264/DIG. 17 |
| 3,912,666 | 10/1975 | Spitzer et al. | 264/DIG. 17 |
| 3,931,762 | 1/1976 | Fukushima et al. | 264/DIG. 17 |
| 4,049,593 | 9/1977 | Sato et al. | 260/2.5 E |

FOREIGN PATENT DOCUMENTS

| | | | |
|---|---|---|---|
| 47-48272 | 12/1972 | Japan | 264/DIG. 17 |
| 7100859 | 8/1971 | Netherlands | 264/DIG. 17 |

Primary Examiner—Philip Anderson
Attorney, Agent, or Firm—Burgess, Ryan and Wayne

[57] ABSTRACT

Flake- or sliver-like porous structures of a polymeric material heavily loaded with a finely divided inorganic substance are prepared by spurting a mixture of the polymeric and finely divided inorganic components in a solvent. The products have many fine, irregular voids. The thickness of walls forming such voids is 5μ or less. The products are especially useful for producing sheet-like structures therefrom by beating and/or refining them followed by general paper making procedures. The sheets, when calendered, have a high initial modulus and improved dimensional stability.

6 Claims, No Drawings

FLAKE- OR SLIVER-LIKE POROUS STRUCTURE OF POLYMERIC MATERIAL AND PROCESS OF PRODUCING SAME, AND PROCESS OF PRODUCING SHEET-LIKE STRUCTURE THEREFROM

This is a continuation, of application Ser. No. 303,063, filed Nov. 2, 1972 and now abandoned.

The invention relates to novel flake-like or sliver-like structures composed of a finely divided inorganic substance and a fiber forming synthetic polymeric material wherein said finely divided inorganic substance is incorporated so that its useful properties may effectively be utilized. The present also relates to a process for producing such novel structures as well as to a process for the production of sheet-like structures from such novel flake-like or sliver-like structures.

Attempts have been made to improve or modify the properties of sheet-like structures composed of organic polymeric materials by incorporating therein finely divided inorganic substances, and some of such procedures are widely used in the manufacture of rubber sheets, plastic films or in paper-making. In these fields, finely divided inorganic substances are utilized as a reinforcing agent or for the purpose of enhancing dimensional stability, rigidity, heat resistance, weatherability or printing properties, or as a filler to reduce the cost of the product. Inorganic substances have inherent properties which are not available in organic polymeric materials such as high resistance to thermal distortion, high rigidity and high surface activity. These useful properties of inorganic substances have heretofore been unavailable.

It has been found that in order to fully utilize the beneficial properties of a finely divided inorganic substance such a substance should be present in the product in proportions as defined by $$1 - W_{pmin} \geq W_f \geq W_{fc} \quad (1)$$

wherein $W_f$ is a weight fraction of the finely divided inorganic substance in the product, $W_{fc}$ is a weight fraction of the finely divided inorganic substance in a speculated composite structure which has been made by compacting the finely divided inorganic particle under a pressure of 10 kg/cm² and completely filling the voids with the polymer, and $W_{pmin}$ is a weight fraction of the polymer required to impart to the composite structure sufficient mechanical properties and is desirably at least 0.1. $W_{fc}$ is referred to as a critical weight fraction of the finely divided inorganic substance and can be expressed as follows:

$$W_{fc} = V_p/(V_p + V_a - V_f) \quad (2)$$

wherein $V_p$ is a specific volume of the polymer, $V_f$ is a true specific volume of the finely divided inorganic substance, and $V_a$ is a bulkiness of the finely divided inorganic substance. $V_a$ may be determined by measuring a volume of a given weight of the finely divided inorganic substance compacted under a pressure of 10 kg/cm².

Thus, in accordance with the present invention, the composite structure comprising a fiber-forming organic polymeric material and a finely divided inorganic substance is highly loaded with the finely divided inorganic substance. If a weight fraction of the finely divided inorganic substance is less than the critical $W_{fc}$, it is impossible to fully develop or utilize the beneficial properties of the finely divided inorganic substance in the composite structure. On the other hand, structures wherein a weight fraction of the finely divided inorganic substance is more than 0.9 are undesirable since they have poor mechanical properties. Accordingly, a weight fraction of the finely divided inorganic substance in the structure should satisfy the following relation:

$$0.9 \geq W_f \geq W_{fc} \quad (3)$$

In accordance with one aspect of the invention, there is provided a flake- or sliver-like porous structure of a fiber-forming organic polymeric material highly loaded with a finely divided inorganic substance which comprises a finely divided inorganic component in a weight fraction of $W_f$ and a polymeric component in a weight fraction of $1 - W_f$, the $W_f$ satisfying the following relation:

$$0.9 \geq W_f \geq V_p/(V_p + V_a - V_f)$$

wherein $W_f$ is a weight fraction of the finely divided inorganic component, $V_p$ is a specific volume of the polymeric component, $V_a$ is a bulkiness of the finely divided inorganic component under 10 kg/cm² and $V_f$ is a true specific volume of the finely divided inorganic component, said structure having a plurality of fine, irregular voids therein, the thickness of walls forming such voids being not more than 5 microns.

It is difficult to prepare a composition of a polymeric material highly loaded with a finely divided inorganic substance by merely blending both particulate components and extruding the molten blend. Transportation and extrusion of such blend will require an excess shear and badly damage the equipment which is used.

In accordance with another aspect of the invention there is provided a process for the production of the above defined flake- or sliver-like porous structure which comprises preparing a composition comprising a finely divided inorganic component in a weight fraction of $W_f$ and a polymeric component in a weight fraction of $1 - W_f$ dispersed in a solvent which has a boiling point lower than the softening point of the polymeric component and is capable of dissolving the polymeric component at elevated temperatures, heating the composition to a sufficient temperature to dissolve the polymeric component in said solvent and extruding the heated composition under at least an autogeneous pressure through an orifice to a zone of a lower pressure and a lower temperature to evaporate the solvent.

The "finely divided inorganic substance" referred to herein is capable of passing through a 100 mesh screen of Japanese Industrial Standard and has a maximum size of up to 500μ. Illustrations of such inorganic substances include, for example, asbestos, alumina, antimony trioxide, barite, calcium carbonate, calcium sulfate, kaolin clay, carbon black, diatomaceous earth, feldspar powder, terra abla, quartz, graphite, magnesium carbonate, magnesium hydroxide, magnesium oxide, mica, molybdenum disulfide, agalmatolite clay, sericite, pyrogenic silica, finely divided silicic acid, silica amorphous, silica sand, silicate, titanium oxide, whiting, slate powder and the like. A mixture of two or more of these inorganic substances may also be employed.

"Polymeric material" or "polymeric component" referred to herein means a fiber-forming organic linear high molecular weight compound which may have stabilizers, antistatics, flame retardants and other conventional additives. Examples of the polymeric materials are polyolefins, such as polyethylenes, polypropylene, polybutene-1, polystyrene and polyisobutylene; polyamides such as polyhexamethylene sebacamide, polycaprolactam and polypyrrolydone; polyesters such as polyethylene terephthalate, poly($\beta$-valerolactone), and poly[p-($\beta$-oxyethoxy) benzoate]; polycarbonates, polyurethanes, polyethers such as polyoxymethylene and poly-[p-(2,6-dimethylphenoxide,)]; homopolymers and copolymers of vinyl compounds such as acrylonitrile, vinyl chloride, vinyl acetate, vinylidene chloride, and methyl methacrylate; a copolymer of vinyl alcohol and ethylene obtained by hydrolysis of a copolymer of vinyl acetate and ethylene. A mixture of two or more of these polymers may also be employed.

Properties of typical polymeric materials and finely divided inorganic substances which may be employed in the practice of the invention are listed in Tables I and II.

Table I

| Finely Divided Inorganic Substance | Particle Size ($\mu$) | $V_f$ (cc/g) | $V_a$ (cc/g) | Surface Area ($m^2$/g) |
|---|---|---|---|---|
| Finely Divided Silicic Acid A | Average 0.020 | 0.50 | 1.91 | 150 |
| Finely Divided Silicic Acid B | Average 0.040 | 0.51 | 2.09 | 80 |
| Finely Divided Silicic Acid C | 0.010 – 0.040 | 0.45 | 6.00 | 380 |
| Diatomaceous Earth | 95% 10 or less | 0.55 | 1.50 | 20 |
| Magnesium Carbonate | Average 0.1 | 0.46 | 1.81 | 20 |
| Clay | 98% 2 or less | 0.38 | 1.70 | 20 |
| Talc | 98% 4 or less | 0.37 | 0.87 | 1.3 |
| Calcium Carbonate A | Average 1.4 | 0.38 | 1.10 | 6 |
| Calcium Carbonate B | Average 4.0 | 0.40 | 0.70 | 2 |
| Calcium Carbonate C | Average 1.0 | 0.41 | 2.8 | 2.5 |
| Magnesium Carbonate/ Calcium Carbonate (4/3 by weight) | — | 0.43 | 1.39 | 14 |
| Finely Divided Silicic Acid/Calcium Carbonate (3/2 by weight) | — | 0.46 | 1.49 | 50 |
| Diatomaceous Earth/ Calcium Carbonate (4/3 by weight) | — | 0.48 | 1.31 | 14 |
| Magnesium Carbonate/ Talc (4/3 by weight) | — | 0.42 | 1.29 | 12 |

Table II

| Polymer | $V_p$ (cc/g) | Softening point (°C) |
|---|---|---|
| High Density Polyethylene | 1.05 | 135 |
| Low Density Polyethylene | 1.10 | 100 |
| Crystalline Polypropylene | 1.09 | 160 |
| Polyacrylonitrile | 0.86 | 232 |
| Polyethylene Terephthalate | 0.77 | 200 |
| Polyvinyl Chloride | 0.70 | 150 |
| Polystyrene | 0.95 | 160 |
| Nylon-66 | 0.88 | 240 |
| Polymethyl Methacrylate | 0.84 | 140 |

In Table I, $V_a$ is a bulkiness of a finely divided inorganic substance and is measured under a load of 10 kg/cm$^2$ in a manner as noted below.

The measurement is carried out at a temperature of 25° C. and under dry conditions using a cylinder of 15 cm in height and $2\sqrt{\pi}$ cm inner diameter having a removable flat bottom and equipped with a plunger movable up and down by means of an air-cylinder and capable of applying a load of 10 kg/cm$^2$. A predetermined portion (Wg) of the finely divided inorganic substance to be measured is weighed and placed in the cylinder. The sample in the cylinder is then leveled by gently knocking the cylinder with a wood hammer. A load of 10 kg/cm$^2$ is then applied on the plunger via the air-cylinder and allowed to stand for 1 minute. The plunger is then lifted. Another portion (Wg) of the sample is introduced to the cylinder and the general procedure as described above is repeated. The procedure is repeated 10 times in total. A volume of the sample (10 x Wg) stacked in the cylinder is measured, and a bulkiness of the sample is calculated therefrom. The value of W employed in this measurement depends on a particular finely divided inorganic substance and is determined in a manner as follows. An appropriate portion of the sample is weighed and placed in a scaled glass cylinder of an inner diameter of $2\sqrt{\pi}$ cm and a length of 30 cm and having a flat bottom so that the cylinder may be filled to a depth of about 20 cm with the sample. The cylinder is then caused to fall distance of 2 cm onto a fixed surface at a rate of 60 times per minute. The height of the sample in the cylinder is gradually lowered to an equilibrium value. From this value and the weight of the sample, a bulk density of the sample is calculated and adapted as W in the above measurement.

Values of $V_f$ given in Table I were determined by a method in accordance with JIS-K-5101. Values of softening point and $V_p$ given in Table II were determined by methods in accordance with ASTM-D-1526 and JIS-K-6760, respectively.

With respect to typical polymer-finely divided inorganic substance systems, values of the critical weight fraction ($W_{fc}$) of the finely divided inorganic substance were calculated in accordance with the equation (2). The results are given in Table III.

Table III

| Polymer - Finely Divided Inorganic Substance | | $W_{fc} \times 100$ |
|---|---|---|
| High Density Polyethylene | - Finely Divided Silicic Acid A | 42.7 |
| " | - Finely Divided Silicic Acid C | 15.9 |
| " | Calcium Carbonate A | 59.3 |
| Crystalline Polypropylene | Magnesium Carbonate | 44.7 |
| " | Diatomaceous Earth | 53.4 |
| " | Clay | 76.2 |
| " | Talc | 68.6 |
| High Density Polyethylene | - Calcium Carbonate A | 61.6 |
| " | - Calcium Carbonate C | 31.4 |
| " | Clay | 75.5 |
| Crystalline Polypropylene | - Diatomaceous Earth/ Calcium Carbonate (3/2 by weight) | 56.8 |
| Polyethylene Terephthalate | - Finely Divided Silicic Acid/Calcium Carbonate (4/3 by weight) | 42.8 |
| Nylon 66 | - Finely Divided Silicic Acid A | 38.4 |
| Polyvinyl Chloride | - Finely Divided Silicic Acid A | 33.2 |
| Crystalline Polypropylene | - Finely Divided Silicic Acid/Calcium Carbonate (4/3 by weight) | 51.4 |
| Crystalline Polypropylene | Low Density Polyethylene (50/50) - Finely Divided | |

Table III-continued

| Polymer - Finely Divided Inorganic Substance | $W_{fc} \times 100$ |
|---|---|
| Silicic Acid A | 43.6 |

As seen from the equation (2), the greater the difference between the apparent and true specific volumes of the inorganic substance, the less the critical weight fraction of the finely divided inorganic substance, permitting the selection of the chemical composition within a wider range. Preferred inorganic substances are finely divided silicic acid, basic magnesium carbonate, diatomaceous earth, calcium carbonate and a combination thereof.

As shown in the first example in Table III, a system comprising a high density polyethylene and a finely divided silicic acid A should contain at least 42.7% by weight of the silicic acid. This corresponds to at least 57.5% by volume of the finely divided silicic acid A. Generally, in composite structures according to the invention, a volume fraction of the finely divided inorganic substance is higher than that of the polymeric material.

Solvents which may be employed in the production of the flake- or sliver-like porous structure should have a boiling point lower than the softening point of the employed polymer and should be capable of dissolving the polymer under the extrusion conditions. They should also be substantially inert to the polymer and materials from which the equipment used is employed.

Illustrative of suitable solvents, one can mention, for example, hydrocarbons such as butane, hexane, cyclohexane, pentene, benzene and toluene; halogenated hydrocarbons such as methylene chloride, chloroform, methyl chloride, propyl chloride, trichloroethylene, trichloroethane, tetrachloroethylene, tetrachloroethane and chlorobenzenes; alcohols such as methanol, ethanol, propanol and butanol; ketones such as acetone, cyclopentanone, methyl ethyl ketone and hexafluoroacetone; esters such as methyl acetate, ethyl acetate and γ-butyrolactane, ethers such as ethyl ether, tetrahydrofurane and dioxane; nitriles such as acetonitrile and propionitrile; trifluoroacetic acid, carbon tetrachloride, carbon disulfide, nitromethane, water, sulfur dioxide and a combination thereof. Depending on the nature of the particular polymeric material, a suitable solvent should appropriately be selected.

In practice, a mixture of the finely divided inorganic substance in a weight fraction of $W_f$ and the polymeric material in a weight fraction of $1 - W_f$ dispersed in a solvent which satisfies the above-mentioned requirements is prepared and heated in a closed vessel to dissolve the polymeric material in said solvent. A proportion of the solvent employed should desirably be such that the resulting heated mixture having the polymeric component dissolved therein will be flowable enough to be pumped. The mixture is maintained under an autogeneous pressure of at least 5 kg/cm², preferably at least 10 kg/cm², and is extruded under this autogeneous pressure or higher pressures through an orifice into a zone of a lower pressure and a lower temperature, preferably into an ambient atmosphere, to suddenly evaporate the solvent thereby leaving the desired flake- or sliver-like porous structure. The last mentioned operation may be referred to as "spurting".

In the practice of the process, any suitable apparatus, including a conventional autoclave, may be employed provided that such equipment has an orifice through which the heated mixture may be extruded or ejected under elevated temperature and pressures. Conveniently, a continuous extruder can be employed comprising a pressuring portion, compressing portion, heating portion, metering portion and an extrusion head having an orifice or orifices.

In accordance with still another aspect of the invention there is provided a process for the production of sheet-like structures of a fiber-forming organic polymeric material highly loaded with a finely divided inorganic substance which comprises: (1) dispersing flake- or sliver-like porous structures, as described above, in a liquid medium in which said structures are substantially insoluble; (2) applying a mechanical force to said dispersion thereby beating said structures to form fibrid-like structural elements; (3) depositing said structural elements two- or three-dimensionally to form a web with adjacent structural elements entangled and/or bonded at their contacting area; (4) removing the liquid medium from the web, and; (5) optionally calendering the web.

A liquid medium in which the flake- or sliver-like porous structures may be dispersed should preferably be selected from those which are volatile (e.g. having a boiling point of well lower than 200° C.), inexpensive, non-toxic non-explosive and readily recoverable or disposable. Examples of the preferred liquid medium include water, and halogenated hydrocarbons, such as methylene chloride, trichloroethylene, tetrachloroethylene, trichloroethane and trichlorotrifluoroethane. The water may contain additives employed in a normal beating process for preparing paper stuffs such as surfactants and dispersing agents.

In beating and/or refining the flake- or sliver-like structures to form the fibrid-like structural elements, various types of beater and/or refiner for paper-making may conveniently be employed. For depositing the fibrid-like structural elements to form a web, conventional paper-making machines may suitably be used.

Since the flake- or sliver-like structures in accordance with the invention can be successfully beaten and/or refined in aqueous media, they may be processed together with a wood pulp to prepare a mixed stuff containing both fibrid-like structural elements of the invention and beaten cellulose fibers. In practice, the flake- or sliver-like structures in accordance with the invention and a wood pulp may concurrently be beaten or refined in one or more conventional types of equipment. Alternatively, the flake- or sliver-like structures in accordance with the invention may be beaten and/or refined to a predetermined level of freeness and, after adding a wood pulp, beating and/or refining may be further continued. Proportions of the structures, in accordance with invention, and a wood pulp are not critical and depend on the desired properties and the intended use of the final sheet-like structures. However, a weight ratio of the flake- or sliver-like structures to a wood pulp should desirably be at least 10:90, to fully enjoy the advantages of the sheet-like products of the invention.

A process for producing sheet-like structures described herein is a technical advance over prior art processes in several aspects. Even if the polymeric component is composed of a hydrophobic polyolefin, the flake- or sliver-like porous structures in accordance with the invention can successfully be beaten and/or refined together with hydrophilic cellulosic pulp in an aqueous medium to provide a slurry in which fibrid-like structural element are well dispersed. From the resulting slurry, useful sheets may be made. This fact reveals that the flake- or sliver-like structures and the sheet-like products in accordance with the invention are fairly hydrophilic and that the beneficial properties of the finely divided inorganic substance can fully be developed or utilized in the structures according to the invention.

Sheet-like products obtained by a process in accordance with the invention exhibit enhanced post-processability when compared with similar products obtained by prior art processes since the former products have lower densities and contain more voids, and in consequence, can adsorb various agents applied thereto to a greater extent. Thus, antistatic agents, flame retarding agents and other additives may readily be applied to the sheet-like structures of the invention. Furthermore, they may be made into composite or laminated structures by a conventional process involving the impregnation of the sheet-like structures with a monomer or a solution of a polymeric material.

The sheet-like products of the invention may be calendered at an appropriate temperature. It has been found that the calendered products have a surprisingly high initial modulus. They also have an excellent dimensional stability. By way of an example, a calendered sheet obtained by the process in accordance with the present invention and comprising 40 parts by weight of high density polyethylene and 60 parts by weight of finely divided silicic acid undergoes little or no shrinkage when heated to temperatures slightly below the melting point of the polyethylene. When fired, it goes on burning with little or no shrinkage. These results are surprising and quite unexpected as compared with the behavior of the comparable sheet-like products of polyethylene prepared by prior art processes which undergo shrinkage to a great extent when merely approaching a heating source.

If desired, the sheet-like products of the invention may be embossed to give them a paper-like appearance, or to enhance whiteness, opacity and/or receptivity of printing inks.

The sheet-like products of the invention are useful in the fields in which the prior art sheet-like products have found their applications. Among others, they are particularly useful as paper-substitutes for printing since they have an excellent receptivity to printing inks owing to the high loading of the finely divided inorganic substance.

The flake- or sliver-like structures of the invention are useful not only as a raw material in the manufacture of the sheet-like products described herein, but also as a primary or secondary molding material for the production of various heat-insulators, packings, sound absorbers and absorbents. The flake- or sliver-like structures of the invention may also be formed into a sheet-like material by pressing and rolling.

The invention will be further illustrated by the following examples, in which the finely divided inorganic particle and polymeric components employed were those as indicated in Tables I and II unless otherwise specified.

Tensile strength, break elongation and initial modulus of a sheet-like structure were measured on a sample 1 cm long, at 25° C. and 65% R.H. with a rate of stretch of 50% per minute. Bending modulus of a sample was determined by measuring an amount of flex on a sample supported at one end at 25° C. and 65% R.H. and calculating in accordance with the following equation:

$$E = 3\rho l^4 / 2yh^2$$

wherein E is a bending modulus, $\rho$ is a density of the sample, l is an extending length of the sample, Y is an amount of flex at the extended end of the sample and $h$ is a thickness of the sample. The extending length of the sample was adjusted so that y/l would have a value within the range of 0.2 to 0.4. In the examples, all parts are by weight.

EXAMPLE 1

A mixture of 60 parts of finely divided silicic acid having a bulkiness of 2.0 ml/g, 40 parts of a high density polyethylene and 850 parts of methylene chloride was charged in an autoclave and heated to a temperature of 200° C. while stirring. The inner pressure of the autoclave was raised to a level of 60 kg/cm² by means of nitrogen. The conditions were maintained for about 10 minutes. At the end of the period, the mixture was spurted through an orifice provided at the bottom of the autoclave and having a diameter of 1.0 mm into an atmosphere of air.

The products so obtained were discrete flake-like structures comprising fine porous bodies having a plurality of irregular voids therein, the thickness of the walls forming each void being less than 5μ.

EXAMPLES 2–55

Following the general procedures as described in Example 1, mixtures of polymer components, finely divided inorganic components and solvents as indicated in Table IV below, were charged in an autoclave, heated and pressurized under stirring and spurted through an orifice provided at the bottom of the autoclave. Components and proportions of the charges and spurting conditions are listed in Table IV, as well as appearance of the products. All the products were porous bodies having voids of irregular configurations, the walls forming such voids being less than 5μ in thickness.

Table IV

| Ex. | Charged Composition | Spurting Conditions | Product |
|---|---|---|---|
| 2 | High Density Polyethylene 30 parts<br>Finely Divided Silicic Acid A 70 parts<br>Methylene Chloride 800 parts | 150° C.<br>60 kg/cm² Orifice Diameter 1 mm | Fine Flake-like Structure |
| 3 | High Density Polyethylene 60 parts<br>Finely Divided Silicic Acid B 40 parts<br>Methylene Chloride 800 parts | 220° C.<br>80 kg/cm² Orifice Diameter 1.5 mm | Fine Sliver-like Structure |
| 4 | High Density Polyethylene 50 parts<br>Finely Divided Silicic Acid B 50 parts<br>Methylene Chloride 800 parts | " | " |
| 5 | High Density Polyethylene 15 parts<br>Finely Divided Silicic Acid A 85 parts<br>Methylene Chloride 850 parts | 150° C.<br>62 kg/cm² Orifice Diameter 1 mm | Fine Flake-like Structure |
| 6 | High Density Polyethylene 40 parts<br>Finely Divided Silicic Acid B 60 parts<br>Methylene Chloride 800 parts | 150° C.<br>55 kg/cm² Orifice Diameter 1.5 mm | Fine Flake-like Structure |
| | High Density Polyethylene 30 parts | 200° C. | Fine |

Table IV-continued

| Ex. | Charged Composition | Spurting Conditions | Product |
|---|---|---|---|
| 7 | Calcium Carbonate A 70 parts<br>Methylene Chloride 800 parts | 60 kg/cm² Orifice Diameter 1 mm | Flake-like Structure |
| 8 | High Density Polyethylene 20 parts<br>Calcium Carbonate B 80 parts<br>Methylene Chloride 750 parts | " | " |
| 9 | High Density Polyethylene 50 parts<br>Magnesium Carbonate 50 parts<br>Methylene Chloride 800 parts | 220° C.<br>80 kg/cm² Orifice Diameter 1.5 mm | Fine Sliver-like Structure |
| 10 | High Density Polyethylene 30 parts<br>Magnesium Carbonate 70 parts<br>Methylene Chloride 800 parts | 200° C.<br>60 kg/cm² Orifice Diameter 1 mm | Fine Flake-like Structure |
| 11 | High Density Polyethylene 15 parts<br>Magnesium Carbonate 85 parts<br>Methylene Chloride 820 parts | 170° C.<br>58 kg/cm² Orifice Diameter 1 mm | " |
| 12 | High Density Polyethylene 40 parts<br>Diatomaceous Earth 60 parts<br>Methylene Chloride 780 parts | 180° C.<br>59 kg/cm² Orifice Diameter 1 mm | " |
| 13 | High Density Polyethylene 20 parts<br>Diatomaceous Earth 80 parts<br>Methylene Chloride 800 parts | 180° C.<br>60 kg/cm² Orifice Diameter 1 mm | Fine Flake-like Structure |
| 14 | High Density Polyethylene 20 parts<br>Clay 80 parts<br>Methylene Chloride 750 parts | 190° C.<br>62 kg/cm² Orifice Diameter 1 mm | " |
| 15 | High Density Polyethylene 40 parts<br>Talc 60 parts<br>Methylene Chloride 800 parts | 150° C.<br>60 kg/cm² Orifice Diameter 1 mm | Fine Sliver-like Structure |
| 16 | High Density Polyethylene 20 parts<br>Talc 80 parts<br>Methylene Chloride 800 parts | 150° C.<br>62 kg/cm² Orifice Diameter 1 mm | Fine Flake-like Structure |
| 17 | High Density Polyethylene 40 parts<br>Finely Divided Silicic Acid A 60 parts<br>Trichlorotrifluoroethane 700 Parts | 200° C.<br>60 kg/cm² Orifice Diameter 1 mm | " |
| 18 | Crystalline Polypropylene 40 parts<br>Finely Divided Silicic Acid B 60 parts<br>Methylene Chloride 780 parts | 200° C.<br>60 kg/cm² Orifice Diameter 1 mm | Fine Flake-like Structure |
| 19 | Crystalline Polypropylene 40 parts<br>Finely Divided Silicic Acid B 60 parts<br>Methylene Chloride 800 parts | 150° C.<br>62 kg/cm² Orifice Diameter 1 mm | " |
| 20 | Crystalline Polypropylene 60 parts<br>Finely Divided Silicic Acid B 40 parts<br>Methylene Chloride 800 parts | 200° C.<br>65 kg/cm² Orifice Diameter 1 mm | " |
| 21 | Crystalline Polypropylene 50 parts<br>Finely Divided Silicic Acid B 50 parts<br>Methylene Chloride 780 parts | 200° C.<br>62 kg/cm² Orifice Diameter 1 mm | " |
| 22 | Crystalline Polypropylene 30 parts<br>Finely Divided Silicic Acid A 70 parts<br>Methylene Chloride 810 parts | 155° C.<br>60 kg/cm² Orifice Diameter 1 mm | " |
| 23 | Crystalline Polypropylene 15 parts<br>Finely Divided Silicic Acid A 85 parts<br>Methylene Chloride 810 parts | 150° C.<br>60 kg/cm² Orifice Diameter 1 mm | Fine Flake-like Structure |
| 24 | Crystalline Polypropylene 50 parts<br>Magnesium Carbonate 50 parts<br>Methylene Chloride 800 parts | " | " |
| 25 | Crystalline Polypropylene 30 parts<br>Magnesium Carbonate 70 parts<br>Benzene 800 parts | 230° C.<br>65 kg/cm² Orifice Diameter 1.5 mm | " |
| 26 | Crystalline Polypropylene 30 parts<br>Magnesium Carbonate 70 parts<br>Methylene Chloride 800 parts | 150° C.<br>60 kg/cm² Orifice Diameter 1 mm | " |
| 27 | Crystalline Polypropylene 15 parts<br>Magnesium Carbonate 85 parts<br>Methylene Chloride 820 parts | " | " |
| 28 | Crystalline Polypropylene 40 parts<br>Calcium Carbonate A 60 parts<br>Methylene Chloride 750 parts | " | Fine Sliver-like Structure |
| 29 | Crystalline Polypropylene 30 parts<br>Calcium Carbonate 70 parts<br>Benzene 650 parts<br>Butane 150 parts | 220° C.<br>65 kg/cm² Orifice Diameter 1 mm | Fine Flake-like Structure |
| 30 | Crystalline Polypropylene 30 parts<br>Calcium Carbonate 70 parts<br>Methylene Chloride 800 parts | 150° C.<br>60 kg/cm² Orifice Diameter 1 mm | " |
| 31 | Crystalline Polypropylene 50 parts<br>Finely Divided Silicic Acid/Calcium Carbonate (3/2 by weight) 50 parts<br>Methylene Chloride 800 parts | 180° C.<br>68 kg/cm² Orifice Diameter 1 mm | " |
| 32 | Crystalline Polypropylene 80 parts<br>Diatomaceous Earth/Calcium Carbonate (4/3 by weight) 70 parts<br>Methylene Chloride 800 parts | 180° C.<br>60 kg/cm² Orifice Diameter 1 mm | " |
| 33 | Crystalline Polypropylene 40 parts<br>Diatomaceous Earth 60 parts<br>Methylene Chloride 750 parts | " | " |
| 34 | Crystalline Polypropylene 30 parts<br>Diatomaceous Earth 70 parts<br>Methylene Chloride 800 parts | 150° C.<br>65 kg/cm² Orifice Diameter 1 mm | Fine Flake-like Structure |
| 35 | Crystalline Polypropylene 30 parts<br>Talc 70 parts<br>Methylene Chloride 800 parts | 180° C.<br>60 kg/cm² Orifice Diameter 1 mm | " |
| 36 | Crystalline Polypropylene 20 parts<br>Clay 80 parts<br>Methylene Chloride 800 parts | " | " |
| 37 | Crystalline Polypropylene 30 parts<br>Talc 70 parts | 236° C.<br>65 kg/cm² Orifice | " |

Table IV-continued

| Ex. | Charged Composition | Spurting Conditions | Product |
|---|---|---|---|
|  | Cyclohexane 800 parts | Diameter 1 mm |  |
|  | Polyethylene Terephthalate 60 parts | 200° C. |  |
| 38 | Calcium Carbonate 40 parts | 60 kg/cm² Orifice | " |
|  | Methylene Chloride 150 parts | Diameter 0.5 mm |  |
|  | Nylon 66 60 parts | 240° C. | Fine |
| 39 | Finely Divided Silicic Acid A 40 parts | 65 kg/cm² Orifice | Flake-like Structure |
|  | Water 500 parts | Diameter 1.5 mm |  |
|  | Polyoxymethylene 50 parts | 200° C. |  |
| 40 | Finely Divided Silicic Acid B 50 parts | 60 kg/cm² Orifice | " |
|  | Methylene Chloride 800 parts | Diameter 0.5 mm |  |
|  | Crystalline Polypropylene 30 parts | 150° C. |  |
| 41 | Magnesium Carbonate/ Calcium Carbonate (4/3 by weight) 70 parts | 55 kg/cm² Orifice | " |
|  | Methylene Chloride 800 parts | Diameter 1 mm |  |
|  | Crystalline Polypropylene 30 parts | 160° C. |  |
| 42 | Magnesium Carbonate 65 parts | 60 kg/cm² Orifice | " |
|  | Titanium Oxide 5 parts | Diameter 1 mm |  |
|  | Methylene Chloride 800 parts |  |  |
|  | Crystalline Polypropylene 30 parts |  |  |
| 43 | Magnesium Carbonate/Talc (4/3 by weight) 70 parts | " | " |
|  | Methylene Chloride 800 parts |  |  |
|  | Crystalline Polypropylene 30 parts | 160° C. | Fine |
| 44 | Low Density Polyethylene 10 parts | 58 kg/cm² Orifice | Flake-like Structure |
|  | Finely Divided Silicic Acid B 60 parts | Diameter 0.8 mm |  |
|  | Methylene Chloride 800 parts |  |  |
|  | Polyacrylonitrile 50 parts | 230° C. | Fine |
| 45 | Finely Divided Silicic Acid A 50 parts | 80 kg/cm² Orifice | Sliver-like Structure |
|  | Water 300 parts | Diameter 1 mm |  |
|  | Acetonitrile 500 parts |  |  |
|  | Crystalline Polypropylene 30 parts | 190° C. | Fine |
| 46 | Polymethyl Methacrylate 10 parts | 80 kg/cm² Orifice | Flake-like Structure |
|  | Magnesium Carbonate 60 parts | Diameter 1 mm |  |
|  | Methylene Chloride 600 parts |  |  |
|  | Butane 200 parts |  |  |
|  | Polyethylenetelephthalate 50 parts | 200° C. |  |
| 47 | Finely Divided Silicic Acid A/ Calcium Carbonate (3/2 by weight) 50 parts | 53 kg/cm² Orifice | " |
|  | Methylene Chloride 750 parts | Diameter 0.5 mm |  |
|  | High Density Polyethylene 40 parts | 230° C. | Fine |
| 48 | Magnesium Carbonate 60 parts | 65 kg/cm² Orifice | Flake-like Structure |
|  | Hexane 750 parts | Diameter 1 mm |  |
|  | Polyvinyl Chloride 60 parts | 200° C. |  |
| 49 | Finely Divided Silicic Acid 40 parts | 80 kg/cm² Orifice | " |
|  | Methylene Chloride 300 parts | Diameter 0.8 mm |  |
|  | Hexane 50 parts |  |  |
|  | Low Density Polyethylene 60 parts | 180° C. |  |
| 50 | Finely Divided Silicic Acid B 40 parts | 60 kg/cm² Orifice | " |
|  | Methylene Chloride 500 parts | Diameter 0.8 mm |  |
|  | Low Density Polyethylene 50 parts | 180° C. |  |
| 51 | Magnesium Carbonate 50 parts | 55 kg/cm² Orifice | " |
|  | Methylene Chloride 600 parts | Diameter 0.8 mm |  |
|  | Low Density Polyethylene 40 parts | 160° C. |  |
| 52 | Finely Divided Silicic Acid A 60 parts | 60 kg/cm² Orifice | " |
|  | Methylene Chloride 750 parts | Diameter 0.8 mm |  |
|  | Low Density Polyethylene 40 parts | 160° C. | Fine |
| 53 | Diatomaceous Earth 60 parts | 60 kg/cm² Orifice | Flake-like Structure |
|  | Methylene Chloride 700 parts | Diameter 0.8 mm |  |
|  | High Density Polyethylene 30 parts | 155° C. |  |
| 54 | Finely Divided Silicic Acid B 70 parts | 60 kg/cm² Orifice | " |
|  | Methylene Chloride 820 parts | Diameter 0.5 mm |  |
|  | High Density Polyethylene 60 parts | 220° C. |  |
| 55 | Finely Divided Silicic Acid B 40 parts | 68 kg/cm² Orifice | Sliver-like |
|  | Methylene Chloride 650 parts | Diameter 1.0 mm | Structure |
|  | Butane 50 parts |  |  |

EXAMPLE 56

A mixture of 30 parts of ethylene/vinyl acetate copolymer containing 12% by weight of vinyl acetate and having $V_p$ of 1.08, 70 parts of finely divided silicic acid A and 800 parts of methylene chloride was charged in an autoclave and heated to a temperature of 180° C. while stirring. The inner pressure of the autoclave was raised to a level of 60 kg/cm² by means of nitrogen. The conditions were kept for about 15 minutes. At the end of the period, the mixture was spurted through an orifice provided at the bottom of the autoclave and having a diameter of 1.0 mm into an atmosphere of air. The products were flake-like structures comprising fine porous bodies having a plurality of irregular voids therein.

EXAMPLE 57

A slurry of 40 parts of crystalline polypropylene, 60 parts of finely divided silicic acid A and 0.2 part of β-(4-oxy-3,5-di-tert-butylphenyl)propionic acid ester of pentaerythritol in 800 parts of methylene chloride was charged in a slurry tank, and passed by a pump provided at the bottom of the tank through a pipe to a heating zone, wherein it was heated to a temperature of 130° C. The slurry was then passed to a homogenizer maintained at the same temperature to provide a homogeneous dispersion, which was then spurted at a pressure of 58 kg/cm² through an orifice provided at the top of the homogenizer and having a diameter of 1.0 mm to an atmospheric air. The products so obtained were flake-like structures comprising fine porous bodies having a plurality of irregular voids therein.

EXAMPLES 58–73

The general procedures as described in Example 57 were repeated. Components and proportions of the slurries and spurting conditions are listed in Table V, as well as appearance of the products. All the products were porous bodies having irregular voids, in thickness of the walls forming such voids being less than 5μ.

Table V

| Ex. | Charged Composition | Spurting Conditions | Product |
|---|---|---|---|
| 58 | High Density Polyethylene 60 parts<br>Finely Divided Silicic Acid B 40 parts<br>Methylene Chloride 650 parts<br>Butane 50 parts | 220° C.<br>68 kg/cm²<br>Orifice Diameter 1 mm | Fine Sliver-like Structure |
| 59 | High Density Polyethylene 30 parts<br>Finely Divided Silicic Acid A 70 parts<br>Methylene Chloride 820 parts | 155° C.<br>60 kg/cm²<br>Orifice Diameter 0.5 mm | Fine Flake-like Structure |
| 60 | High Density Polyethylene 15 parts<br>Finely Divided Silicic Acid A 85 parts<br>Methylene Chloride 850 parts | 150° C.<br>58 kg/cm²<br>Orifice Diameter 0.5 mm | " |
| 61 | High Density Polyethylene 50 parts<br>Magnesium Carbonate 50 parts<br>Methylene Chloride 750 parts | 200° C.<br>62 kg/cm²<br>Orifice Diameter 1 mm | Fine Flake-like Structure |
| 62 | High Density Polyethylene 30 parts<br>Magnesium Carbonate 70 parts<br>Methylene Chloride 800 parts | 160° C.<br>60 kg/cm²<br>Orifice Diameter 0.5 mm | " |
| 63 | Crystalline Polypropylene 30 parts<br>Finely Divided Silicic Acid A 70 parts<br>Methylene chloride 820 parts | 150° C.<br>58 kg/cm²<br>Orifice Diameter 0.5 mm | " |
| 64 | Crystalline Polypropylene 40 parts<br>Magnesium Carbonate 60 parts<br>Methylene Chloride 750 parts | 155° C.<br>60 kg/cm²<br>Orifice Diameter 0.5 mm | " |
| 65 | High Density Polyethylene 20 parts<br>Calcium Carbonate A 80 parts<br>Methylene Chloride 500 parts | 160° C.<br>58 kg/cm²<br>Orifice Diameter 1 mm | " |
| 66 | Crystalline Polypropylene 30 parts<br>Magnesium Carbonate Calcium Carbonate (4/3 by weight) 70 parts<br>Methylene Chloride 800 parts | 155° C.<br>57 kg/cm²<br>Orifice Diameter 0.5 mm | Fine Flake-like Structure |
| 67 | High Density Polyethylene 80 parts<br>Finely Divided Silicic Acid C 20 parts<br>Methylene Chloride 800 parts | 200° C.<br>50 kg/cm²<br>Orifice Diameter 1.0 mm | Fine Sliver-like Structure |
| 68 | Crystalline Polypropylene 80 parts<br>Finely Divided Silicic Acid C 20 parts<br>Methylene Chloride 800 parts | 200° C.<br>60 kg/cm²<br>Orifice Diameter 1.0 mm | " |
| 69 | High Density Polyethylene 70 parts<br>Finely Divided Silicic Acid C 30 parts<br>Methylene Chloride 1000 parts | 200° C.<br>50 kg/cm²<br>Orifice Diameter 1.0 mm | Fine Flake-like Structure |
| 70 | High Density Polyethylene 50 parts<br>Finely Divided Silicic Acid C 50 parts<br>Methylene Chloride 1000 parts | 180° C.<br>50 kg/cm²<br>Orifice Diameter 1.0 mm | Very Fine Flake-like Structure |
| 71* | High Density Polyethylene 20 parts<br>Finely Divided Silicic Acid B 80 parts<br>Methylene Chloride 1000 parts | 200° C.<br>50 kg/cm²<br>Orifice Diameter 1.0 mm | Extremely Fine Flake-like Structure |
| 72 | Crystalline Polypropylene 15 parts<br>Finely Divided Silicic Acid A 85 parts<br>Methylene Chloride 850 parts | 180° C.<br>40 kg/cm²<br>Orifice Diameter 1.0 mm | " |
| 73 | Crystalline Polypropylene 70 parts<br>Calcium Carbonate 30 parts<br>Methylene Chloride 1000 parts | 200° C.<br>50 kg/cm²<br>Orifice Diameter 1.0 mm | " |

*So fine that it was difficult to collect the product by a net.

EXAMPLE 74

In an autoclave, 80 parts of a high density polyethylene (MI = 0.3), 20 parts of finely divided silicic acid (C) and 1,000 parts of methylene chloride were heated to a temperature of 200° C. and the polyethylene was dissolved in the methylene chloride. Upon heating, the inner pressure of the autoclave was raised to about 40 kg/cm². The inner pressure was further raised to 50 kg/cm² by nitrogen gas. The mixture was then spurted through an orifice provided at the bottom of the autoclave and having a diameter of 1.0 mm. The product so obtained was a web-like assembly comprising flakes of irregular configurations. By observing a cross-section of the product, it has been found that it had a plurality of irregular voids having walls of less than 5μ in thickness.

EXAMPLE 75

A mixture of 40 parts of a high density polyethylene (MI = 0.3), 60 parts of a finely divided silicic acid (B) and 1,000 parts of methylene chloride was charged in an autoclave and pressurized to about 10–15 kg/cm² by nitrogen. The autoclave was then heated to a temperature of 200° C. The heated mixture was then spurted through an orifice provided at the bottom of the autoclave and having a diameter of 1.0 mm to an atmosphere of air. The products so obtained had flake-like structures comprising the polyethylehe having the finely divided silicic acid uniformly dispersed therein.

Using a blastgraph, 40 parts of the polyethylene and 60 parts of the finely divided silicic acid was compounded. However a homogeneous dispersion could not be obtained.

EXAMPLE 76

A dispersion containing very fine fibrid-like structural elements was prepared by agitating 8 g of flake-like structures as obtained in Example 1 and 1.5l of methylene chloride in a juice mixer for 3 minutes at 10,000 rpm. Using a manual papermaking machine similar to that as employed in the TAPPI standard method, a sheet-like structure was made from the dispersion. The product was a highly white, opaque and bulky shoot-like structure. It had a strength of 0.5 kg/mm² and a break elongation of 40%. The sheet was then calendered between a pair of calendering rolls to provide a smooth synthetic sheet having a porosity of 40.1%. The final sheet had thickness of 125μ, basic weight of 118.4 g/m², strength of 3.1 kg/mm², break elongation of 34%, initial modulus of 130 kg/mm² and bending modulus of 330 kg/mm².

EXAMPLE 77

Using various spurted products sheet-like structures were prepared in a manner as described in Example 76. The sheet-like structures were calendered under conditions as indicated in Table VII to prepare synthetic sheets. Properties of the final products are shown in Table VI.

Table VI

| Spurted product from Ex. | Strength (kg/mm²) | Initial modulus (kg/mm²) | Break elongation (%) | Bending modulus (kg/mm²) | Porosity (%) |
|---|---|---|---|---|---|
| 2 | 1.9 | 133 | 21 | 330 | 43 |
| 3 | 4.4 | 86 | 89 | 240 | 34 |
| 4 | 4.5 | 101 | 75 | 300 | 33 |
| 5 | 1.7 | 127 | 20 | 303 | 40 |
| 6 | 2.7 | 120 | 41 | 250 | 37 |
| 7 | 1.5 | 95 | 55 | 113 | 41 |
| 8 | 1.3 | 123 | 42 | 271 | 43 |
| 9 | 2.6 | 73 | 77 | 255 | 38 |
| 10 | 2.4 | 93 | 40 | 345 | 42 |
| 11 | 2.4 | 97 | 43 | 350 | 39 |
| 12 | 2.0 | 47 | 105 | 92 | 41 |
| 13 | 1.5 | 72 | 27 | 145 | 47 |
| 14 | 2.3 | 97 | 3.7 | 180 | 44 |
| 15 | 2.1 | 75 | 40 | 170 | 46 |
| 16 | 1.1 | 93 | 2.5 | 185 | 51 |
| 17 | 3.7 | 31 | 110 | 85 | 34 |
| 18 | 2.1 | 89 | 23 | 190 | 44 |
| 19 | 2.5 | 97 | 35 | 211 | 39 |
| 20 | 2.7 | 95 | 75 | 170 | 41 |
| 21 | 2.5 | 84 | 47 | 214 | 42 |
| 22 | 1.3 | 133 | 4 | 231 | 47 |
| 23 | 1.2 | 85 | 3 | 208 | 53 |
| 24 | 3.0 | 71 | 77 | 237 | 35 |
| 25 | 2.4 | 95 | 11 | 241 | 47 |
| 26 | 2.6 | 101 | 13 | 230 | 36 |
| 27 | 1.2 | 115 | 7 | 190 | 55 |
| 28 | 2.7 | 55 | 79 | 111 | 43 |
| 29 | 1.2 | 65 | 17 | 135 | 54 |
| 30 | 1.7 | 71 | 19 | 137 | 53 |
| 31 | 2.3 | 89 | 45 | 211 | 47 |
| 32 | 1.2 | 41 | 57 | 95 | 48 |
| 33 | 2.3 | 47 | 78 | 93 | 35 |
| 34 | 1.2 | 51 | 25 | 100 | 44 |
| 35 | 1.4 | 89 | 30 | 151 | 43 |
| 36 | 1.3 | 111 | 3 | 172 | 51 |
| 37 | 1.3 | 75 | 7 | 155 | 44 |
| 38 | 4.7 | 130 | 3 | 255 | 31 |
| 41 | 1.5 | 121 | 11 | 244 | 44 |
| 42 | 1.3 | 85 | 13 | 180 | 43 |
| 43 | 1.4 | 112 | 4 | 235 | 45 |
| 44 | 2.2 | 100 | 15 | 217 | 37 |
| 45 | 0.7 | 75 | 31 | 80 | 60 |
| 46 | 1.7 | 111 | 13 | 200 | 40 |
| 47 | 2.7 | 155 | 5 | 370 | 34 |
| 48 | 3.1 | 99 | 27 | 212 | 36 |
| 49 | 1.0 | 55 | 37 | 250 | 25 |
| 50 | 2.3 | 63 | 104 | 111 | 37 |
| 51 | 2.7 | 87 | 63 | 115 | 35 |
| 52 | 2.1 | 51 | 27 | 119 | 39 |
| 53 | 2.0 | 47 | 100 | 93 | 33 |
| 54 | 2.4 | 125 | 45 | 279 | 45 |
| 55 | 3.5 | 85 | 110 | 211 | 38 |
| 56 | 2.3 | 41 | 99 | 85 | 44 |

Table VII

| Spurted product from Ex. | Calendering Temp. (° C) | Pressure (kg/cm²) | Rate (m/min) |
|---|---|---|---|
| 2 – 17 | | | |
| 48 | 125 | 20 | 2 |
| 50 – 56 | | | |
| 18 – 37 | | | |
| 41 – 46 | 135 | 20 | 2 |
| 49 | | | |
| 38 | | | |
| 47 | 180 | 10 | 2 |

EXAMPLE 78

A mixture of 60 parts of finely divided silicic acid B, 40 parts of a high density polyethylene and 900 parts of methylene chloride was charged in an autoclave and heated to a temperature of 200° C. while stirring. The inner pressure of the autoclave was raised to a level of 50 kg/cm² by means of nitrogen. The conditions were maintained for about 5 minutes. At the end of the period, the mixture was spurted through an orifice having a diameter of 1.0 mm, provided at the bottom of the autoclave, into an ambient atmosphere. The products so obtained were discrete flake-like structures comprising porous bodies having a plurality of irregular voids therein, the thickness of walls forming the voids being less than 5μ.

Using water as a liquid medium, a mixture of 45 g of the dried flake-like structure and 5 g of a wood pulp was beaten in a disc refiner, under beating conditions having a fiber concentration of 1.0% and a clearance of 0.2 mm, to an aqueous dispersion having very fine fibrid-like structural elements uniformly dispersed therein. A hand made sheet was prepared from the dispersion by means of a TAPPI standard sheet machine. The sheet was highly white, opaque and bulky, and had a tenacity of 0.06 kg/mm² and a break elongation of 5.1%.

EXAMPLE 79

A mixture of 70 parts anhydrous gypsum and 30 parts of a high density polyethylene was dispersed in 720 ml of methylene dichloride in an autoclave, and nitrogen gas was introduced into the autoclave to a pressure of about 10 kg/cm². The autoclave was heated to dissolve the polyethylene in the methylene dichloride. When the inner temperature was raised to 180° C., a valve provided at the bottom of the autoclave was opened to allow the mixture in the autoclave to go to and pass through an orifice provided at the end of the valve into an ambient atmosphere. The orifice had a length of 1.0 mm and a diameter of 1.0 mm. The products were a flock of flake-like structures and slightly more rigid than flake-like structures obtained by a similar process wherein finely divided silicic acid was used as a finely divided inorganic component.

Similar results were obtained with a calcined gypsum and hydrated gypsums.

EXAMPLE 80

Flake-like structures comprising 60% by weight of finely divided silicic acid A and 40% by weight of a high density polyethylene were prepared under conditions such as those employed in Example 17. A slurry for use in paper-making was prepared by immersing 1 kg of the flake-like structures in 100l of water and beating the same in a refiner. To the slurry, a filler, size and tenacity enhancing agent were added and fixed by aluminum sulfate in a manner as conventionally practiced in a paper-making process. A wet web was then formed and dried at a temperature of 80° C. When 5% by weight, based on fibers in the slurry, of a polymer of acrylamide was used as the tenacity enhancing agent, a sheet having a tenacity of 3.0 kg/cm² was obtained. The sheet was then calendered at a temperature of 100° C. and a roll pressure of 50 kg/cm to provide a calendered product having a tenacity of 16 kg/cm² and exhibiting better mechanical properties in water than sheets of paper made from natural fibers.

EXAMPLE 81

Using water as a liquid medium, a mixture of (1) 90 parts of flake-like structures, prepared by a process in Example 18, and comprising 40 parts of finely divided silicic acid B and 60 parts of crystalline polypropylene with (2) 10 parts of a wood pulp was beaten at a fiber concentration of about 1% by weight to form a slurry. From a portion of the slurry so obtained, a wet web was prepared and dried at a temperature of 80° C. to provide a sheet having a density of about 0.2 g/cm³ and a breaking length of about 70 m. When calendered at a temperature of 105° C. and a roll pressure of 50 kg/cm, the breaking length of the sheet was increased to a level of about 700 m.

To another portion of the slurry about 5% by weight, based on the weight fibers, of a tenacity enhancing agent, a polymer of acrylamide, was added, and a sheet was prepared therefrom. The tenacity of the sheet so obtained was about twice that of a product obtained from the slurry to which the tenacity enhancing agent had not been added. The tenacity could further be increased by calendering the sheet.

EXAMPLE 82

A mixture of 5 kg of a wood pulp with 5 kg of flake-like structures prepared by a process in Example 17 and comprising 40% by weight of a high density polyethylene and 60% by weight of finely divided silicic acid A was beaten in 1,000 kg of water to provide an aqueous slurry having a fiber concentration of 0.3% by weight and a freeness of 240 cc. To the slurry, 0.7% by weight, based on the weight of fibers, of a tenacity enhancing agent, a polymer of acrylamide, was added and flocculated by the addition of aluminum sulfate. From the slurry, a wet web was formed and dried at temperatures of 80° to 90° C. to provide a white and rigid sheet having a density of 0.5 g/cm³. The sheet was then calendered at a temperature of 85° C. and a roll pressure of 50 kg/cm to provide a product having a basis weight of about 90 g/m² and a tenacity of 3.15 kg/1.5 cm. The product was superior in opacity to sheets obtained from 100% wood pulp.

What is claimed is:

1. A process for the production of flake- or silver-like porous structures composed of a finely divided inorganic component and a fiber forming synthetic polymeric component which comprises: (1) forming a mixture consisting essentially of the finely divided inorganic component in a weight fraction of $W_f$ and a fiber or film forming polymeric component in a weight fraction of $1 - W_f$ dispersed in a solvent which has a boiling point lower than the softening point of the polymeric component and is capable of dissolving the polymeric component at elevated temperatures, the solvent being present in an amount at least sufficient to dissolve the polymeric component at an elevated temperature, the weight fraction $W_f$ satisfying the following relation:

$$0.9 \geq W_f \geq V_p/(V_p + V_a - V_f)$$

wherein $W_f$ is the weight fraction of the finely divided inorganic component based on the combined weight of the finely divided inorganic and polymeric components, $V_p$ is the specific volume of the polymeric component, $V_a$ is the bulkiness of the finely divided inorganic component and $V_f$ is the true specific volume of the finely divided inorganic component;

(2) heating said mixture to an elevated temperature under at least autogenous pressure to dissolve the polymeric component in the solvent and (3) ejecting the heated mixture through an orifice into a zone of lower pressure and lower temperature whereby solvent is evaporated from the mixture and flake- or sliver-like porous structures are formed.

2. A process according to claim 1 wherein said solvent for the polymeric component is at least one selected from the group consisting of benzene, toluene, butane, hexane, cyclohexane, pentene, methylene chloride, chloroform, methyl chloride, propyl chloride, trichloroethylene, trichloroethane, tetrachloroethylene, tetrachloroethane, chlorobenzenes, methanol, ethanol, propanol, butanol, acetone, cyclopentanone, methyl ethyl ketone, hexafluoroacetone, methyl acetate, ethyl acetate, X-butyrolactone, ethyl ether, tetrahydrofurane, dioxane, acetonitrile, propionitrile, trifluoroacetic acid, carbon tetrachloride, carbon/disulfide, water, Freon gas and sulfur dioxide.

3. A process according to claim 1 wherein the mixture of the finely divided inorganic component and the polymeric component dispersed in the solvent is heated in a closed system to a sufficient temperature at which an autogenous pressure of at least 5 kg/cm² is created.

4. A process according to claim 3 wherein the heated mixture is ejected under a pressure of at least the autogenous pressure through an orifice into a zone of substantially atmospheric pressure.

5. The product obtained by the process of claim 1.

6. The product obtained by the process of claim 4.

* * * * *

UNITED STATES PATENT OFFICE
CERTIFICATE OF CORRECTION

Patent No. 4,146,510    Dated March 27, 1979

Inventor(s) Masahiko Miyanoki, et al

It is certified that error appears in the above-identified patent and that said Letters Patent are hereby corrected as shown below:

Column 1, line 15: "present" should be --present invention--.

Column 2, line 38: after "invention" insert a comma.

Column 5, line 41: after "$\gamma$-butyrolactane", the comma should be a semi-colon.

Column 14, line 55: "polyethylehe" should be --polyethylene--.

line 59: after "However" insert a comma.

Column 15, line 3: "shoot-like" should be --sheet-like--.

Column 17, line 27: "of" should be deleted.

line 50: "basis" should be --basic--.

Column 18, line 41: "X" should be -- $\gamma$ --.

Signed and Sealed this

Twenty-third Day of October 1979

[SEAL]

Attest:

RUTH C. MASON
Attesting Officer

LUTRELLE F. PARKER
Acting Commissioner of Patents and Trademarks